ized Patent [19]

Clark et al.

[11] 4,029,934
[45] June 14, 1977

[54] WELDING, AND A STEEL SUITABLE FOR USE THEREIN

[75] Inventors: Allan Clark, Newton Aycliffe; Philip Robert Kirkwood, Middlesbrough, both of England

[73] Assignee: British Steel Corporation, London, England

[22] Filed: Sept. 3, 1976

[21] Appl. No.: 720,358

Related U.S. Application Data

[63] Continuation of Ser. No. 497,089, Aug. 13, 1974, abandoned.

[30] Foreign Application Priority Data

Aug. 20, 1973 United Kingdom ............ 39235/73

[52] U.S. Cl. .................... 219/145; 428/576; 428/385; 75/123 B; 75/123 J; 75/123 M; 75/124; 148/36; 148/127; 219/73 A; 219/146
[51] Int. Cl.² .............. B23K 35/08; B23K 35/22; B23K 35/36; C22C 38/14
[58] Field of Search ............. 219/145, 146, 73 A; 75/124, 123 R, 125, 123 B, 123 J, 123 M; 148/36, 127; 29/191.6, 196.3

[56] References Cited

UNITED STATES PATENTS

| 2,140,237 | 12/1938 | Leitner | 219/145 X |
|---|---|---|---|
| 2,280,283 | 4/1942 | Crafts | 75/123 R |
| 2,542,220 | 2/1951 | Urban et al. | 75/123 B |
| 2,798,805 | 7/1957 | Hodge et al. | 75/123 B |
| 3,115,406 | 12/1963 | Ballass et al. | 75/124 |
| 3,328,211 | 6/1967 | Nakamura et al. | 75/124 X |
| 3,600,161 | 8/1971 | Inouye et al. | 75/126 F |
| 3,745,294 | 7/1973 | Arikawa et al. | 219/146 |
| 3,773,500 | 11/1973 | Kanazawa et al. | 75/123 M |

FOREIGN PATENTS OR APPLICATIONS

| 45-21180 | 7/1970 | Japan | 148/36 |
|---|---|---|---|
| 46-32332 | 9/1971 | Japan | 148/36 |
| 1,021,923 | 3/1966 | United Kingdom | 219/146 |

OTHER PUBLICATIONS

Colvin; "Weld Metal Toughness," Welding and Metal Fabrication, Nov. 1974, pp. 362–371.

*Primary Examiner*—Arthur J. Steiner
*Attorney, Agent, or Firm*—Bacon & Thomas

[57] ABSTRACT

A steel which contains up to 0.15% carbon, 0.5 to 1.5% manganese, 0.03 to 0.10% silicon, 0.2 to 0.6% molybdenum, up to 0.05% aluminium, 0.03 to 0.05% titanium and 0.002 to 0.008% boron is particularly suitable as a welding consumable, for example as an electrode for the submerged arc welding of high strength micro-alloyed structural steels. Especially when used with a basic flux, welds can be produced showing excellent notch toughness characteristics which can even be improved by post-weld thermal treatments such as stress relieving and normalizing.

8 Claims, 5 Drawing Figures

WELDING, AND A STEEL SUITABLE FOR USE THEREIN

This is a continuation, of application Ser. No. 497,089, filed Aug. 13, 1974, now abandoned.

This invention relates to welding, especially submerged arc welding and similar welding techniques, and to steel which is suitable for use as a consumable in welding processes.

Submerged arc weldng is a well-known technique in which the welding arc is produced between a consumable electrode and the substrate metal beneath a flux, which is supplied to the process as a granular material but which is fused at the prevailing process temperatures. The final composition of the weld is determined primarily by the individual compositions of the consumable, the flux and the metal being welded.

The predominant factor is the composition of the consumable electrode, but there is a continual interchange of elements between the molten flux and the weld pool, and the high energy input inherent in the process results in a dilution of the weld pool by metal from the material being welded to a degree dependent on the type of weld joint and the actual energy input involved.

A particular problem in the sumberged arc welding of steel has been the notch toughness, or notch ductility, of the weld metal produced. The low levels of notch toughness formerly achieved have been gradually improved by the use of more fully deoxidised consumables incorporating various alloying elements, for example, molybdenum and nickel. There has additionally been a trend away from acid fluxes which tend to introduce silicon and manganese into the weld pool to fully basic fluxes which give a cleaner melt with lower sulphur, phosphorus and residual oxygen.

In spite of these process improvements the notch toughness levels achievable are not always adequate, for example as when welding high strength micro-alloyed structural steels such as BS 4360 Grade 50 D in the construction of off-shore oil platforms for the North Sea. A requirement in this use is that the weld metal must be capable of resisting excessive deterioration of properties during post-weld thermal treatments such as stress relieving (isothermal treatment for 1 hour per inch of thickness at about 600° C) or normalising (austenitising at about 850° C for 1 hour per inch of thickness followed by air cooling). Welds made with the majority of currently available consumables tend to suffer such deterioration, particularly during normalising.

The present invention is directed to a steel suitable for use as a welding consumable having low carbon and silicon contents and containing titanium, boron and molybdenum as essential components. More specifically the invention provides a steel of approximately the following percentage composition, although it is considered that the ranges given can in some cases be extended:

Carbon: 0.15 max, preferably 0.10 max.
Maganese : 0.5 – 1.5
Silicon: 0.03 – 0.10
Molybdenum: 0.2 – 0.6
Aluminium 0.05 max
Titanium: 0.03 – 0.05
Boron: 0.002 – 0.008
Sulphur and Phosphorus: Each 0.04 max, preferably 0.03 max
Iron and incidental impurities: Balance.

The quantity of manganese present is chosen according to the desired strength of the final weld metal.

It may be preferable to have a molybdenum content of at lest 0.3% to ensure an adequate effect from this element.

The aluminium is only present in consequence of its use as a deoxidant in the steelmaking process. It will normally be present in an amount of at least 0.02% for this reason. However, aluminium contents below 0.025%, and more especially 0.02% and below, have been found to give the better weld properties.

The titanium content is very important as it produces additional weld pool deoxidation, promotes the formation of smaller globular inclusions and protects the boron present from the action of oxygen and nitrogen.

Some boron must be present uncombined. It is preferred that the uncombined, or free, boron should be present in an amount of at least 0.0002%. The actual minimum amount of total boron required to be present in the steel will therefore depend on the amount which will be combined with oxygen and nitrogen, but it is considered that a minimum of 0.002% boron will usually result in sufficient free boron remaining in the steel. Low levels of oxygen and nitrogen in the steel are correspondingly desirable.

The type of steelmaking process chosen is not considered to be important. It is preferred to make the steel lacking aluminium, titanium and boron, and to add these elements subsequently in that order. The steel is killed, or deoxidised, principally with the aluminium, the titanium can remove a large part of any residual oxygen, and the boron is then finally added.

The invention additionally provides a welding consumable comprising a wire or rod formed of the steel of the invention, preferably provided with a thin coating of copper. The consumable in the form of wire or rod can be conveniently fed to the weld site. The copper coating improves electrical contact between the wire and the electrical power supply and also protects the wire against corrosion.

The wire will preferably be of a diameter between 1 mm and 8 mm. The amount of copper coating on the wire is suitably up to 0.15% by weight of the wire, the practical upper limit being that amount which results in the quantity of copper being transferred to the weld metal having a detrimental effect on its properties.

The invention further provides a method of welding, especially submerged are welding or electroslag welding, wherein the consumable comprises the steel of the invention or a wire or rod formed of such steel. The welding method is otherwise conventional.

If the flux used is an acid flux there will be a tendency for the titanium and boron to oxidise and for silicon and manganese to transfer from the flux to the weld pool. A basic flux is therefore preferred to reduce oxidation and silicon and manganese transfer.

The invention is illustrated in the following examples in each of which a pair of plates to BS 4360 50D were joined by submerged arc welding with a commercially available basic flux containing the following components in the percentages specified: $SiO_2$, 13.7; MnO, 0.1; $Fe_2O_3$, 1.29; $Al_2O_3$, 19.6; CaO, 12.58; MgO, 29.0; $TiO_2$, 0.5; $K_2O$, 0.76; $Na_2O$, 0.42; $CaF_2$, 18.0; $LiO_2$, 0.32; $Zr_2O_3$, 1.58. The plate thickness was 1.5 inches (38.1 mm).

One set of welds was made with a commonly used commercially available weld wire, designated weld wire CA, and further sets of welds were made with weld wires designated A, B, C, D, E and F in accordance with this invention.

The specification of the wire CA was C, 0.09 – 0.15%; Mn, 1.45 – 1.7%; Si, 0.15 – 0.35%; Mo, 0.15%; Al, 0.02% max; S, 0.030% max; P, 0.030% max.

The analyses of the wires A to F were as shown in Table 1.

TABLE 1

WIRE ANALYSES (%)

| WIRE | C | Si | Mn | Mo | Ti | B | Al | N | O | S | P |
|---|---|---|---|---|---|---|---|---|---|---|---|
| A | .068 | .06 | .95 | .51 | .030 | .004 | .005 | .0043 | .0032 | .009 | .035 |
| B | .076 | .09 | .96 | .51 | .035 | .004 | .010 | .004 | .0041 | .008 | .019 |
| C | .107 | .07 | 1.44 | .45 | .035 | .004 | .020 | .0032 | .012 | .008 | .003 |
| D | .053 | .065 | 1.06 | .46 | .045 | .003 | .032 | .0036 | .0017 | .007 | .002 |
| E | .057 | .10 | 1.01 | .47 | .040 | .003 | .026 | .0103 | .0022 | .007 | .002 |
| F | .060 | .07 | 1.00 | .46 | .062 | .002 | .031 | .0025 | .0041 | .007 | .002 |

The analysis of the test plates used was C, 0.145%; Mn, 1.25%; Si, 0.42%; Mo, 0.025%; Nb, 0.031%; S, 0.022%; P, 0.015%.

Typical weld metal analyses of the welds made are shown in Table 2. All welds were made with a D. C. arc and the consumable electrode polarity was positive, although welds with a negative electrode are also possible. The heat input was 2.83 KJ/mm for the wires A, C, D, E and F, and 6.42 KJ/mm for the wire B. Welds with the commercially available wire CA were made with a range of heat inputs between 2.8 and 5 KJ/mm.

TABLE 2

TYPICAL WELD METAL ANALYSES (%)

| WIRE | C | Si | Mn | Mo | Ti | B | Al | N |
|---|---|---|---|---|---|---|---|---|
| CA | .13 | .3 | 1.4 | .1 | — | — | .005 | .0082 |
| A | .086 | .22 | .91 | .34 | .010 | .0023 | < .005 | .0076 |
| B | .093 | .21 | .96 | .36 | .010 | .0014 | .017 | .0075 |
| C | .062 | .13 | 1.08 | .52 | .013 | .0014 | .016 | .0080 |
| D | .070 | .24 | .99 | .18 | .005 | .0007 | .029 | .0154 |
| E | .066 | .23 | .93 | .28 | .006 | .0010 | .024 | .0157 |
| F | .055 | .13 | .81 | N.D. | .017 | .0005 | .019 | .0079 |

Welds made with the commercially available wire CA and with the wires A, B, C, D and E were tested for notch toughness (Charpy V-notch method) in the as-deposited and stress relieved conditions. Welds made with the wires B and F were also tested in the same way in the normalised condition. The accompaying drawings show graphically the impact toughness properties achieved.

Figure 1:
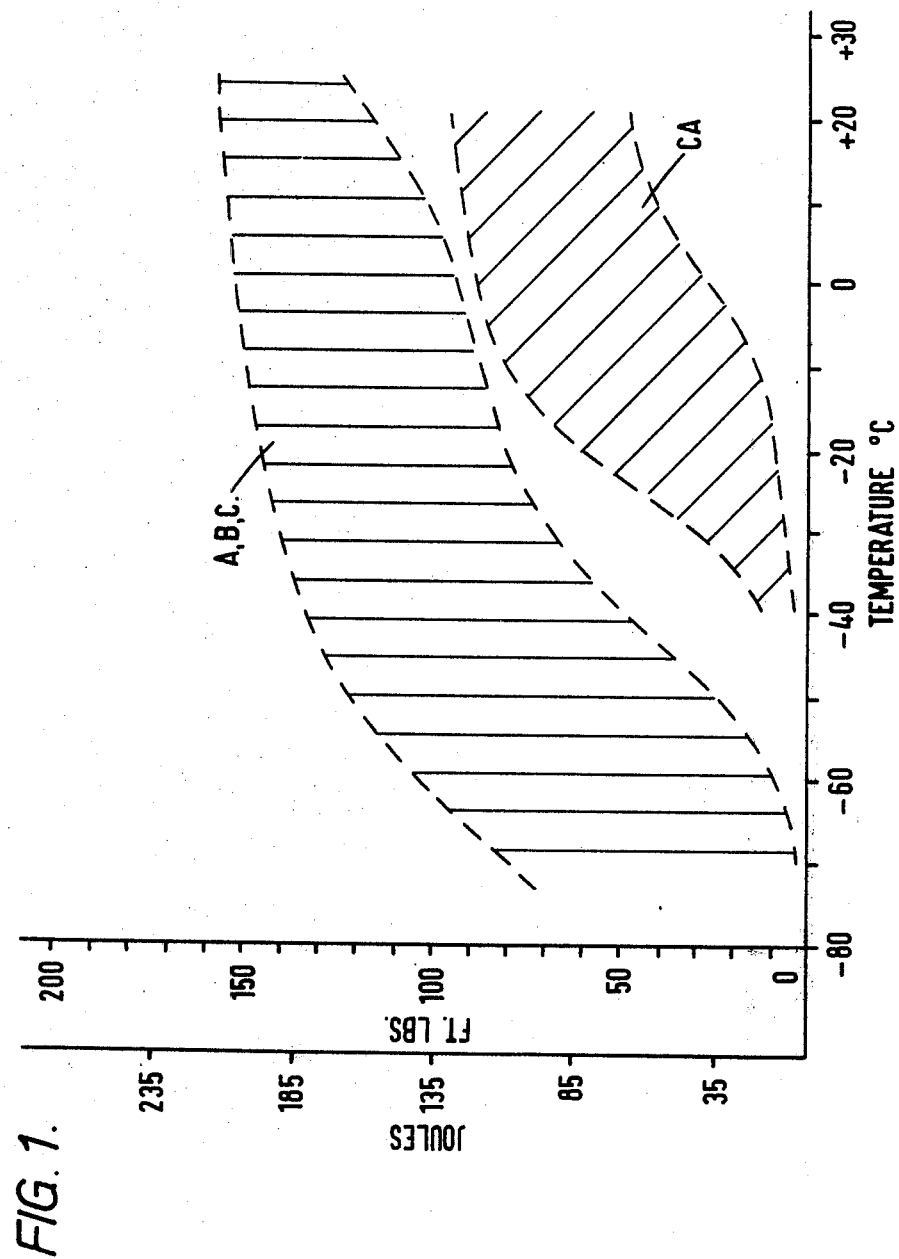
FIG. 1 shows the spread of results for the wires A, B and C compared with the spread of results for the wire CA in the as-deposited condition.
Figure 2:
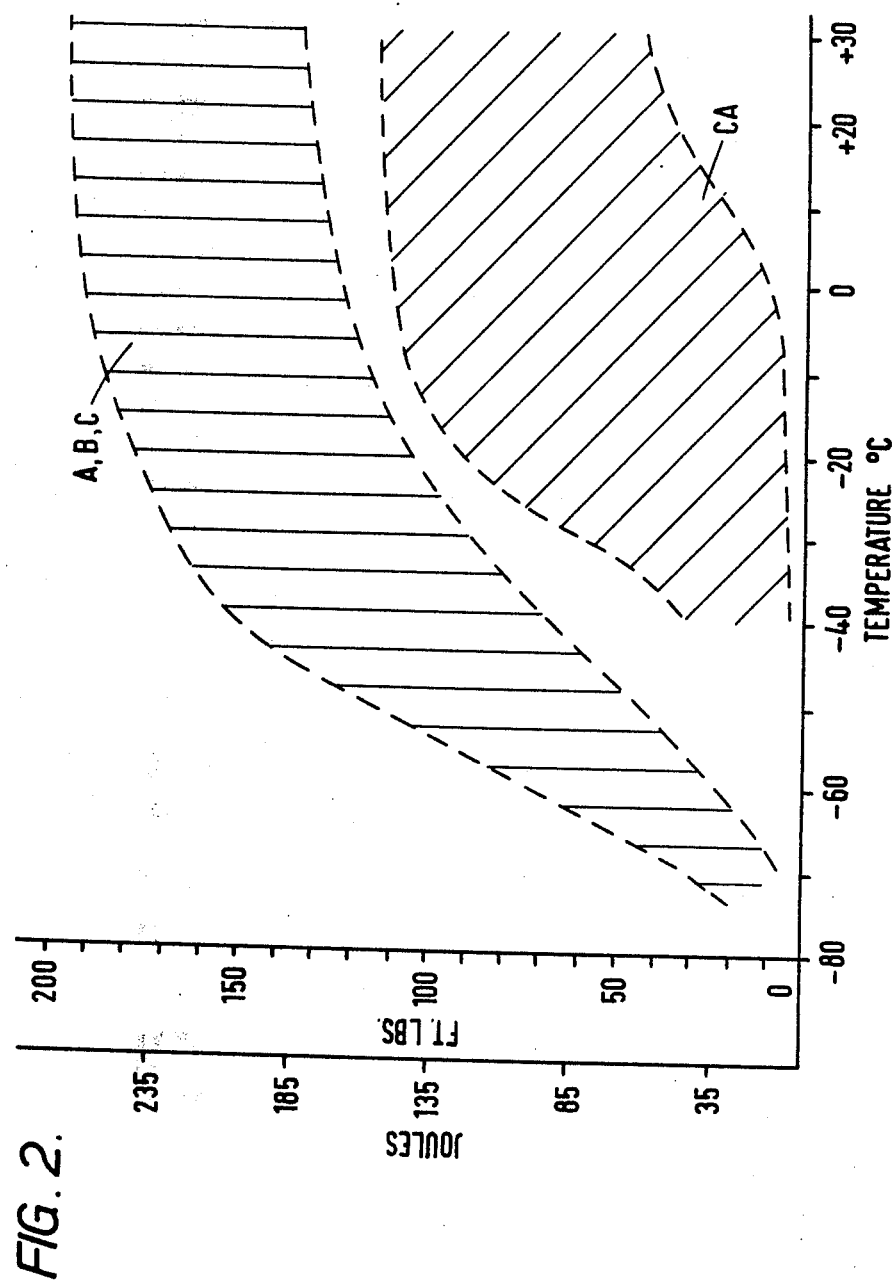
FIG. 2 shows the spread of results for the same wires compared in the stress relieved condition.
Figure 3:
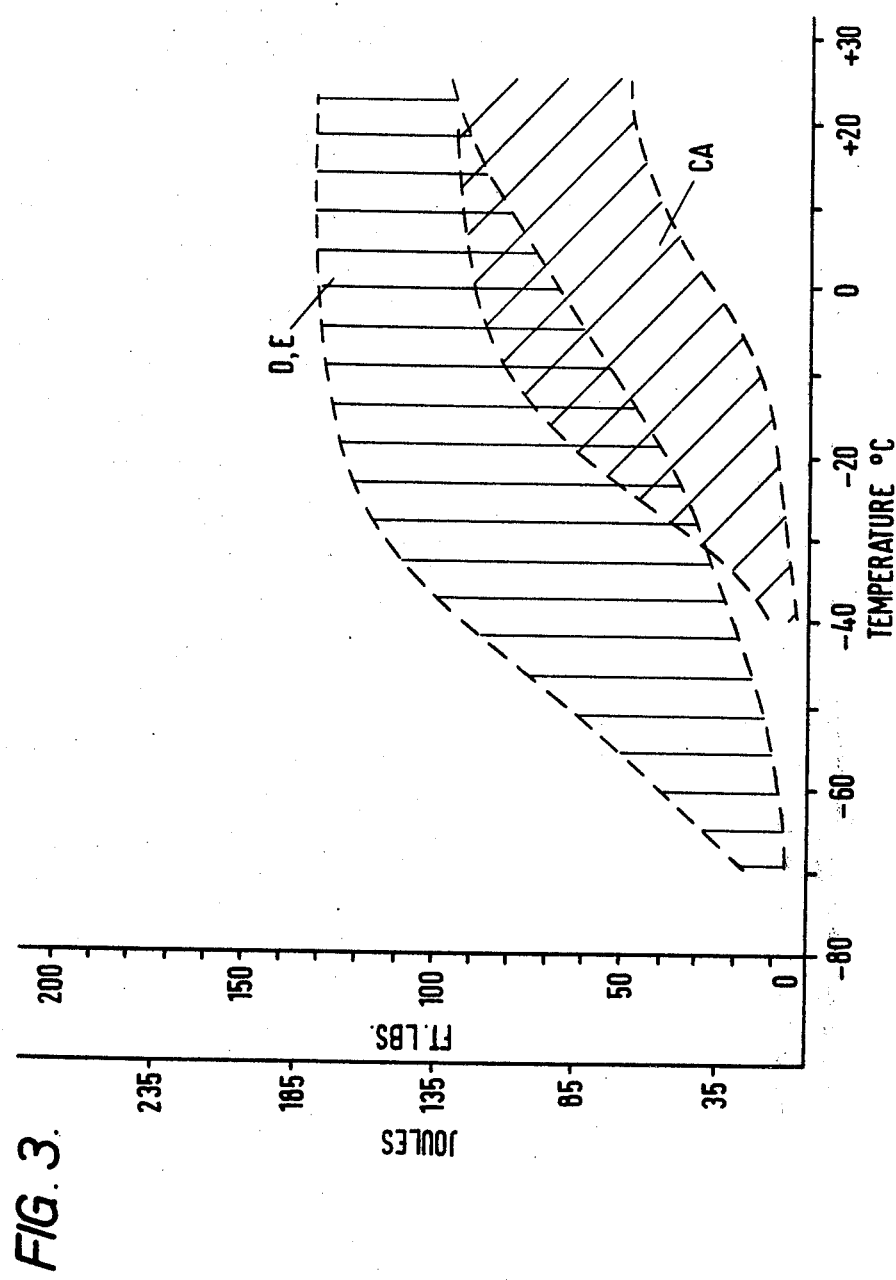
FIG. 3 shows the spread of results for the wires D and E compared with the spread of results for the wire CA in the as-deposited condition.
Figure 4:
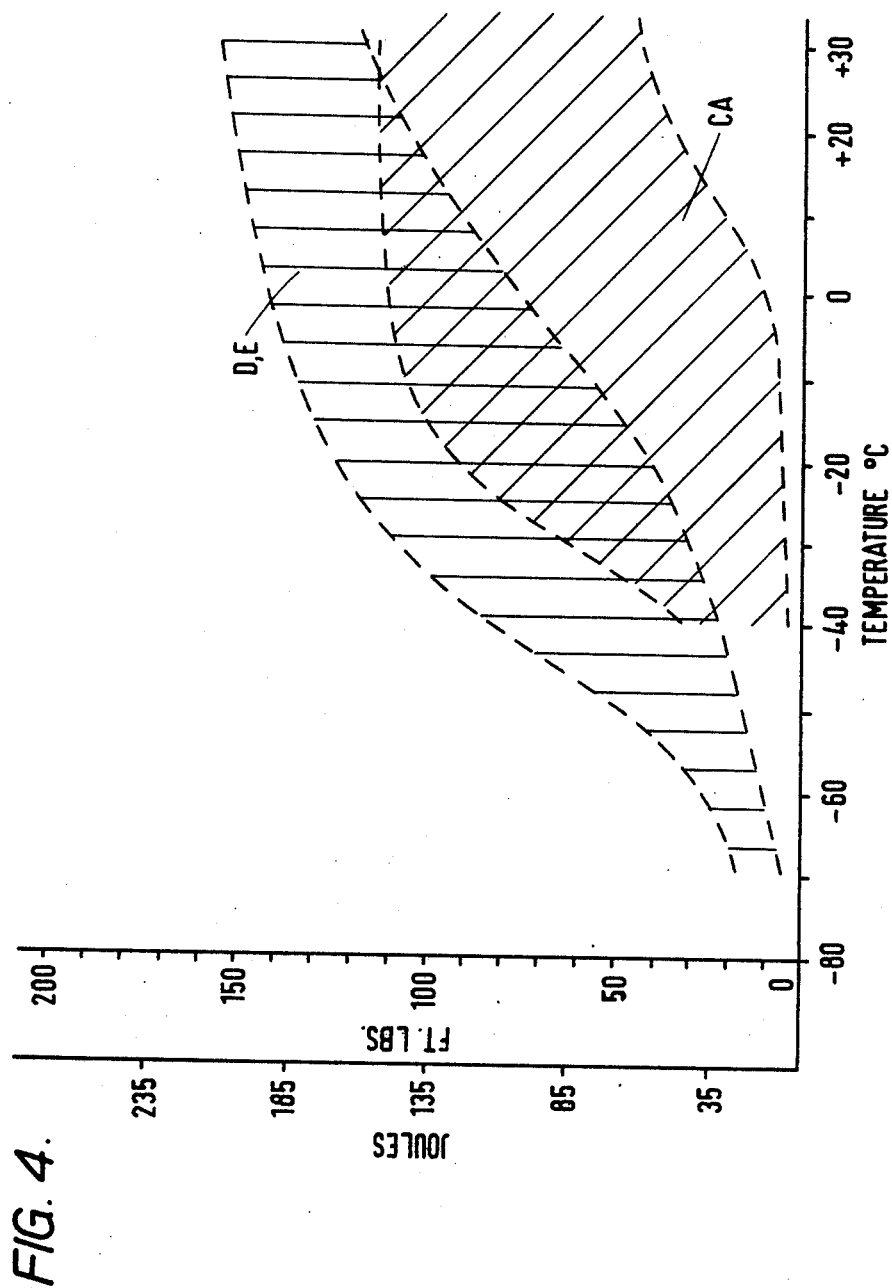
FIG. 4 shows the spread of results for the same wires compared in the stress relieved condition.
Figure 5:
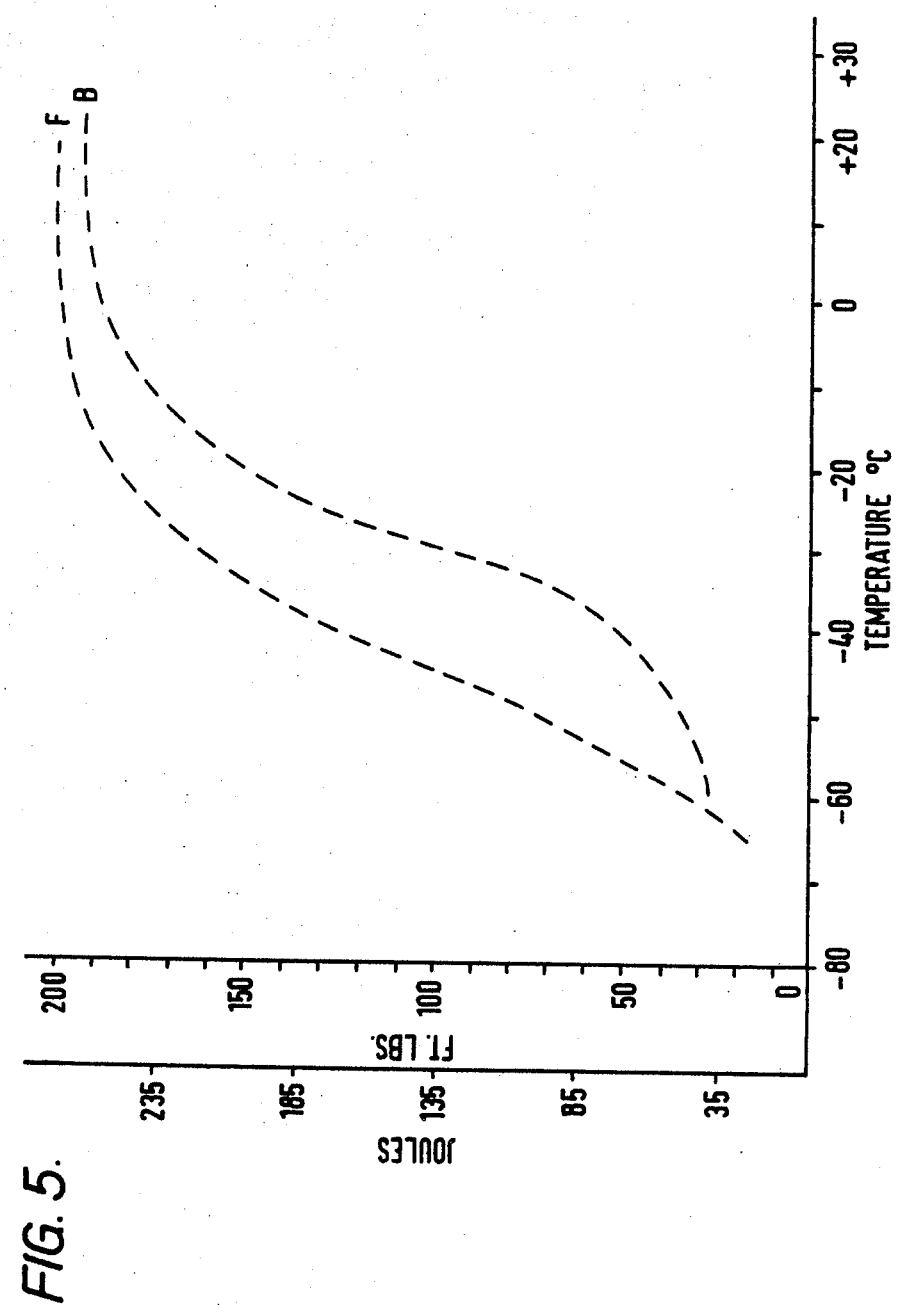
FIG. 5 shows results obtained with the wires B and F in the normalised condition.

It is considered that the diffferences between the wires A, B and C on the one hand and the wires D and E on the other hand in the as-deposited and stress releived conditions may be a significant extent be due to the aluinium content of the former wire being not more than 0.02% while that of the latter wires is around 0.03%

It is clear that greatly superior results have been achieved with the weld wires of this invention, particularly in the stress relieved and normalised conditions where the properties were improved over the as-deposited condition at all test temperatures.

A current specification for welds on this material for North Sea oil platforms requires a notch toughness at —° C of 20 ft. lb. (27 J). With the conventional weld wire this is only just achieved and small variations or defects could lead to rejection of welds as substandard. By using the wire of this invention notch toughness levels in the weld can be achieved which are in excess of those of the parent plate steels. It is envisaged that the wire of the invention may even be suitable for use with cryogenic steels in view of the excellent low temperature properties of the welds otained.

Tensile properties of certain of the welds are shown in Table 3.

TABLE 3

TENSILE PROPERTIES

| WIRE | CONDITIONS | 0.2% PROOF STRESS (N/mm²) | UTS (N/mm²) | ELONGATION (%) | REDUCTION OF AREA (%) |
|---|---|---|---|---|---|
| A | As Deposited | 565 | 597 | 24 | 68 |
| A | Stress Relieved | 531 | 583 | 26 | 70 |
| B | As Deposited | 505 | 590 | 23 | 70 |
| C | As Deposited | 511 | 573 | 26 | 69 |
| C | Stress Relieved | 463 | 523 | 28 | 77 |
| D | As Deposited | 487 | 558 | 28 | 68 |
| D | Stress Relieved | 531 | 592 | 23 | 65 |
| E | As Deposited | 538 | 613 | 27 | 64 |
| E | Stress Relieved | 426 | 528 | 27 | 69 |
| F | As Deposited | 450 | 528 | 26 | 73 |
| F | Stress Relieved | 432 | 499 | 29 | 75 |

We claim:

1. A consumable welding wire for a source of filler metal for a weldment, said wire consisting essentially of:

Carbon 0.15% max

Manganese 0.5–1.5%
Silicon 0.03–0.10%
Molybdenum 0.2–0.6%
Aluminum 0.02% max
Titanium 0.03–0.05%
Boron 0.002–0.008%
Sulphur 0.04% max
Phosphorus 0.04% max
Iron and incidental impurities Balance.

2. The welding wire of claim 1 in which the carbon content is not more than 0.10%.

3. The welding wire of claim 1 in which the molybdenum content is at least 0.3%.

4. The welding wire of claim 1 in which the sulphur and phosphorus contents are each not more than 0.03%.

5. A source of filler metal for a weldment, comprising the consumable wire of claim 1 in combination with a basic flux.

6. The wire of claim 1, further including a thin coating of copper comprising up to about .15% by weight of said wire.

7. In a process for submerged arc welding, the improvement comprising melting a wire having the composition of claim 1 under a basic flux.

8. The method of claim 7, comprising the step of subjecting the weldment to a thermal treatment selected from stress relieving and normalizing to improve the notch toughness of said weldment.

* * * * *